(12) United States Patent
Gheorghe et al.

(10) Patent No.: US 9,128,482 B2
(45) Date of Patent: Sep. 8, 2015

(54) METHOD AND SYSTEM FOR DETECTING JAMMING AND/OR UNCONTROLLED MOVEMENT OF AN AIRCRAFT CONTROL SURFACE

(71) Applicants: Airbus Operations SAS, Toulouse (FR); Institut Polytechnique de Bordeaux, Pessac (FR); Centre National de la Recherche Scientifique (CNRS), Paris (FR); Universite de Bordeaux, Bordeaux (FR)

(72) Inventors: Anca Gheorghe, Toulouse (FR); Rémy Dayre, Pibrac (FR); Philippe Goupil, Beaupuy (FR); Ali Zolghadri, Leognan (FR); Jérôme Cieslak, Talence (FR); David Henry, Saint Aubin de Medoc (FR)

(73) Assignees: Airbus Operations SAS (FR); Institut Polytechnique de Bordeaux (FR); Centre National de la Recherche Scientifique (CNRS) (FR); Universite de Bordeaux (FR)

( * ) Notice: Subject to any disclaimer, the term of this patent is extended or adjusted under 35 U.S.C. 154(b) by 0 days.

(21) Appl. No.: 14/186,109

(22) Filed: Feb. 21, 2014

(65) Prior Publication Data
US 2014/0236396 A1 Aug. 21, 2014

(30) Foreign Application Priority Data
Feb. 21, 2013 (FR) .................................. 13 51502

(51) Int. Cl.
G05B 23/02 (2006.01)
B64C 13/50 (2006.01)
B64D 45/00 (2006.01)

(52) U.S. Cl.
CPC .......... *G05B 23/0243* (2013.01); *B64C 13/503* (2013.01); *B64D 45/0005* (2013.01); *Y02T 50/44* (2013.01)

(58) Field of Classification Search
CPC ............. G05B 23/0243; B64C 13/503; B64D 45/0005; Y02T 50/44
USPC .......................................................... 701/3
See application file for complete search history.

(56) References Cited

U.S. PATENT DOCUMENTS 1,331,018 A * 2/1920 Luthy ............................ 429/143
2,026,158 A * 12/1935 Bennett ......................... 604/398

(Continued)

FOREIGN PATENT DOCUMENTS

| EP | 2026158 A2 | 2/2009 |
| EP | 2204778 A2 | 7/2010 |
| EP | 2551191 A1 | 1/2013 |

OTHER PUBLICATIONS

Bouzerdoum A et al: 11 A Recursive Autoregressive Method for Spectral Estimation11 • Aug. 25, 1996; Aug. 25, 1996-Aug. 30, 1996. vol. 1. Aug. 25, 1996. pp. 312-313. XP010240980.

*Primary Examiner* — Mary Cheung
*Assistant Examiner* — Frederick Brushaber
(74) *Attorney, Agent, or Firm* — Lerner, David, Littenberg, Krumholz & Mentlik, LLP

(57) ABSTRACT

A system for detecting jamming and/or uncontrolled movement of an aircraft control surface includes first means for estimating the value of at least one parameter of an equation simulating the feedback loop dynamic of the control surface, according to a recursive autoregressive method with exogenous variable of RARX type in a recursive least squares way, and second means for detecting jamming and/or uncontrolled movement of the control surface, according to the estimated parameter value by the application of a decision test in the parametric space.

13 Claims, 3 Drawing Sheets

(56) References Cited

U.S. PATENT DOCUMENTS

| | | | | |
|---|---|---|---|---|
| 2,204,778 | A | * | 6/1940 | Sturm ............................ 401/152 |
| 2,551,191 | A | * | 5/1951 | Wartenberg ..................... 16/267 |
| 4,463,605 | A | * | 8/1984 | McDowell et al. .......... 73/866.4 |
| 2003/0080256 | A1 | * | 5/2003 | Urnes et al. ................... 244/194 |
| 2013/0026287 | A1 | | 1/2013 | Goupil et al. |
| 2013/0311011 | A1 | * | 11/2013 | Malta ................................ 701/3 |
| 2013/0325254 | A1 | * | 12/2013 | Goupil et al. ................ 701/33.9 |

* cited by examiner

# METHOD AND SYSTEM FOR DETECTING JAMMING AND/OR UNCONTROLLED MOVEMENT OF AN AIRCRAFT CONTROL SURFACE

FIELD OF THE INVENTION

The present invention relates to a method and a system for detecting jamming and/or uncontrolled movement of an aircraft control surface which is controlled in position by a feedback loop, as well as an electrical flight control system including such a detection system.

The present invention applies to a feedback loop:
which is intended for position control of all types of aircraft control surface, such as ailerons, spoilers or an elevator for example;
which forms part of an electrical flight control system of the aircraft; and
which includes:
said control surface which is movable, and of which the position with respect to the aircraft is adjusted by at least one actuator;
said actuator which adjusts the position of said control surface, as a function of at least one actuating command received;
at least one sensor which measures the effective position of said control surface; and
a (flight control) computer which produces an actuating command for the control surface, transmitted to said actuator, on the basis of said measured effective position and a control command calculated on the basis of the action of the pilot on a control column or the action of the automatic pilot and the status of the aircraft (such as the altitude, the speed and the attitude of the aircraft for example).

Within the scope of the present invention, "jamming" of a control surface is understood to be the situation in which a control surface remains fixed in its current position, that is to say it no longer responds to control commands which vary.

Furthermore, "uncontrolled movement of a control surface" is understood to be a movement of this control surface which is not controlled (that is to say a movement which is not generated by any command of a means intended for its control on the aircraft), which can bring the control surface to its aerodynamic or mechanical abutment if this phenomenon is not detected and stopped.

The present invention therefore relates to the detection of jamming and/or uncontrolled movement of at least one aircraft control surface, due to at least one malfunction (irrespective of the origin of the malfunction), occurring in the associated position control feedback loop, within a flight control system.

BACKGROUND OF THE INVENTION

It is known that the flight control computers perform, inter alia, the position feedback control of the control surfaces of an aircraft, for example a transport aeroplane. The movement of the control surface is generated by an actuator which may be either in active mode or in passive mode. In general, two actuators are provided per control surface. A so-called "master" computer produces the feedback control, by sending a control command via the active actuator. The other actuator, associated with a second, so-called "slave" computer, is forced in passive mode to follow the movement of the control surface. If, via specific monitoring means, the master computer detects a malfunction, it switches the active actuator into passive mode, and gives the control to the slave computer which controls the second actuator (then switched into active mode).

The jamming and/or uncontrolled movement of a control surface, as a function of the flight point of the aircraft, may have consequences for the guidance of said aircraft, on the dimensioning of its structure by virtue of the loads generated and also on its performance. It is therefore necessary to be able to detect such a malfunction sufficiently quickly before the consequences for the aircraft are too great, in particular in order to be able to alert the flight crew so that they can perform the actions limiting the consequences of this malfunction or in order to proceed with an automatic reconfiguration of the system.

BRIEF SUMMARY OF THE INVENTION

An aspect of the present invention limits the aforementioned consequences. The present invention relates to a method which is particularly robust and which is applicable to any type of aircraft with electrical flight control, in order to detect jamming and/or uncontrolled movement of a control surface of the aircraft, which is controlled in position by a feedback loop, said method making it possible to detect such jamming, regardless of its origin, at sufficiently low levels in order to avoid the aforementioned limitations in relation to the aircraft, in a short time, and/or uncontrolled movement, regardless of its origin, in a short time and regardless of the dynamic of this uncontrolled movement.

According to an aspect of the present invention, said method for detecting jamming and/or uncontrolled movement of an aircraft control surface which is controlled in position by a feedback loop forming part of an electrical flight control system of the aircraft and including:
said control surface, which is movable and of which the position with respect to the aircraft is adjusted by at least one actuator;
said actuator which adjusts the position of said control surface, as a function of at least one actuating command received in the form of a feedback command;
at least one sensor which measures the effective position of said control surface; and
at least one computer which produces a command order for the control surface, which receives said measured effective position and which deduces therefrom an actuating command which is transmitted to said actuator in the form of a feedback command,
is remarkable in that in an automatic and repetitive manner the following sequence of successive steps are performed, consisting of:

a) estimating the value of at least one parameter of an equation simulating the feedback loop dynamic of the control surface, according to a recursive autoregressive method with exogenous variable of RARX ("recursive autoregressive with exogenous input") type in a recursive least squares way, b) detecting jamming and/or uncontrolled movement of said control surface, according at least to the estimated parameter value by the application of a decision test in the parametric space.

Thus, by virtue of an aspect of the invention, by the application of a parametric test (which consists of estimating the parameters simulating the feedback loop dynamic of the control surface, according to a recursive autoregressive method with exogenous variable of RARX type in a recursive least squares way, followed by a decision test performed on at least one of the estimated parameters, it is possible to reveal jamming and/or uncontrolled movement of the control surface when it occurs.

More particularly, by virtue of an aspect of the invention it is possible, as specified below, in a short time to detect in the monitored feedback loop any jamming and/or uncontrolled movement of a controlled control surface, regardless of the origin of the malfunction, at sufficiently low levels to avoid the aforementioned limitations with regard to the aircraft.

The method according to an aspect of the invention therefore makes it possible to detect jamming at low amplitudes, and/or uncontrolled movements of different dynamics before the position of the control surface becomes too significant, and thus to improve the controllability of the aircraft, the performance thereof and to reduce the structural loads in the event of malfunction, without penalty regarding the balance of mass and cost (in particular no additional sensor is necessary). The reduction of the structural loads in flight even makes it possible to reduce the weight of the aircraft by an optimisation of its structural design.

According to different embodiments of the invention which could be taken together or separately:

- in the step a), the equation simulating the feedback loop dynamic is second order and has the following form:

$$\hat{y}(k)=b_1(k-1)u(k-nk)-a_1(k-1)y(k-1)$$

in which:
$\hat{y}(k)$ is the estimated position of said control surface at an instant k;
y(k) is the real position of said control surface at the instant k supplied by said sensor;
u(k) is a setpoint, at the instant k, calculated by a flight control computer on the basis in particular of a command given by the pilot;
nk is a number of samples delayed between the given command and the position; and
$a_1(k)$ and $b_1(k)$ are parameters to be estimated at the instant k;
- in the step b), jamming is detected if an estimated value of the parameter $b_1$ converges towards 0;
- in the step b), jamming is detected at least if, said estimated value of the parameter $b_1$ converging towards 0, its absolute value is less than a first predetermined threshold during a given time;
- in the step b), jamming is detected if in addition the absolute value of a feedback setpoint u is greater than a second predetermined threshold;
- in the step b), two confidence regions are defined, on the one hand, by the estimated value of the parameter $b_1$ and an associated covariance matrix estimated online, and on the other hand, by a calculated value of a reference parameter $b_1$ and an associated covariance matrix, and an uncontrolled movement is detected as soon as these two confidence regions no longer overlap;
- in the step b), an uncontrolled movement is detected if at the same time an estimated value of the parameter $b_1$ converges towards 0 and if, simultaneously, an error signal which is a function of data measured or used in the feedback loop (for example u and y) is greater than a third threshold during a confirmation time (the part of the method relating to the error signal being described in the Patent Application FR1156900, which is incorporated by reference herein in its entirety);
- in the step a), the RARX type method takes into account a directional forgetting factor;
- the directional forgetting factor has a first value in order to detect jamming, and a second value in order to detect uncontrolled movement, the first value being less than the second value;
- in the step a), an improved (more robust) version of the RARX type method is used, by the introduction of a directional forgetting factor and a step of UD factorisation according to Bierman;
- in the event of detection of jamming or uncontrolled movement in the step b), an alert is issued.

The invention also relates to a device for detecting jamming and/or uncontrolled movement of an aircraft control surface which is controlled in position by a feedback loop, said feedback loop forming part of an electrical flight control system of the aircraft and including:

- said control surface, which is movable and of which the position with respect to the aircraft is adjusted by at least one actuator;
- said actuator which adjusts the position of said control surface, as a function of at least one actuating command received in the form of a feedback command;
- at least one sensor which measures the effective position of said control surface; and
- a computer which produces a control command for the control surface, which receives said measured effective position and which deduces therefrom an actuating command which is transmitted to said actuator in the form of a feedback current.

According to an embodiment of the invention, this device for detecting jamming and/or uncontrolled movement of said control surface is remarkable in that it includes:

- first means for estimating the value of at least one parameter of an equation simulating the feedback loop dynamic of the control surface, according to a recursive autoregressive method with exogenous variable of RARX type in a recursive least squares way,
- second means for detecting jamming and/or uncontrolled movement of said control surface, according at least to the estimated parameter value by the application of a decision test in the parametric space.

The present invention likewise relates to an electrical flight control system of an aircraft, said system comprising at least one means in order to generate a control surface control command for at least one control surface of the aircraft and at least one feedback loop for controlling the position of this control surface, which comprises:

- said control surface, which is movable and of which the position with respect to the aircraft is adjusted by at least one actuator;
- said actuator which adjusts the position of said control surface, as a function of at least one actuating command received;
- at least one sensor which measures the effective position of said control surface; and
- a computer which produces said control command for the control surface, which receives said effective position and which deduces therefrom an actuating command which is transmitted to said actuator.

According to an aspect of the invention, this electrical control system is remarkable in that it also includes such a device for detecting jamming and/or uncontrolled movement of a control surface.

The invention also relates to an aircraft including such a detection device and/or such an electrical control system.

BRIEF DESCRIPTION OF THE DRAWINGS

The figures of the appended drawings will provide a good understanding of how the invention can be carried out. In these drawings, identical references designate similar elements.

DETAILED DESCRIPTION

Figure 1:
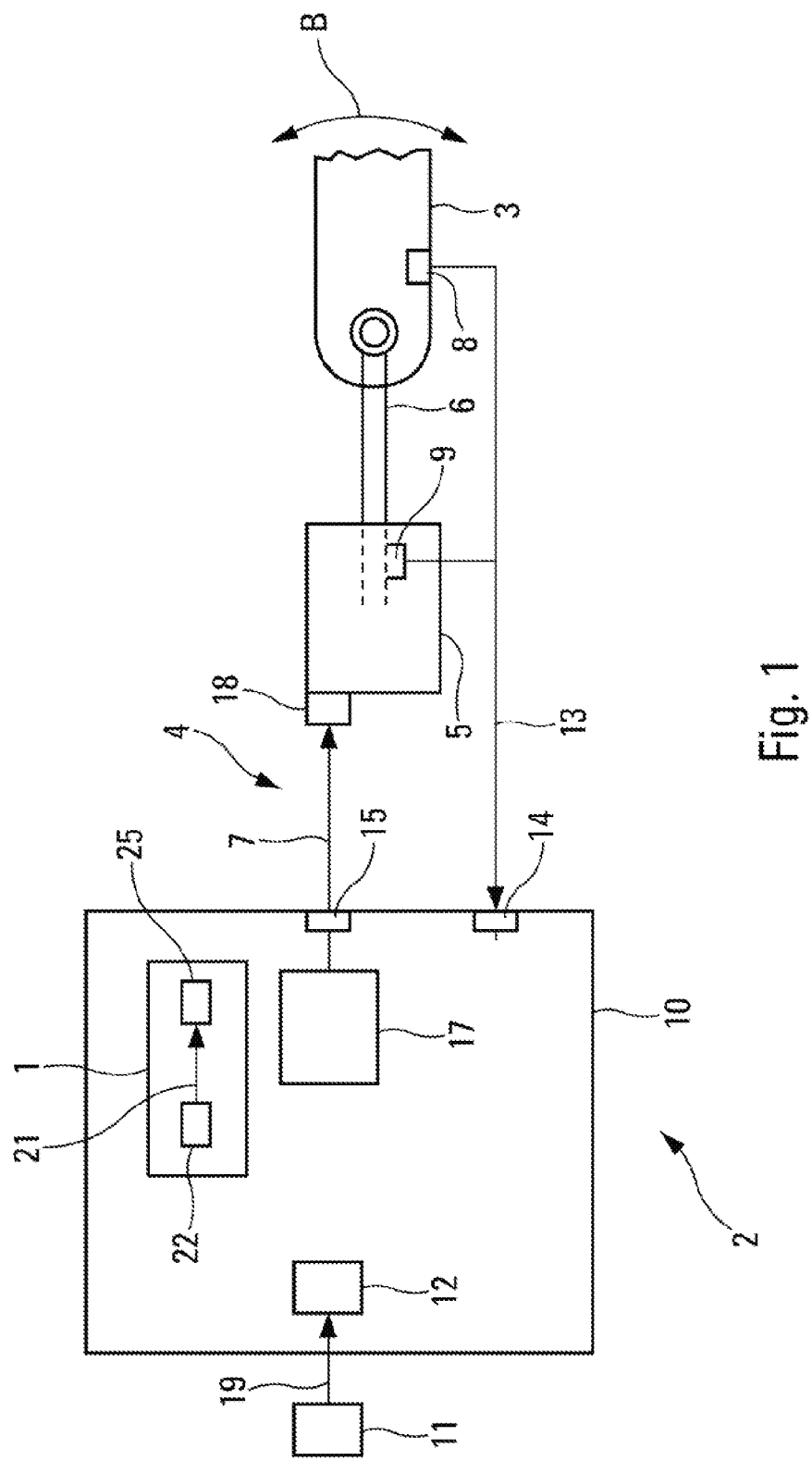
FIG. 1 illustrates schematically a position control feedback loop of an aircraft control surface, which includes a detection device according to a particular embodiment of the invention.

The device 1 according to an embodiment of the invention is intended to detect at least a jamming and/or an uncontrolled movement of a control surface 3 (aileron, spoiler, elevator, rudder) of an aircraft, in particular a transport aeroplane, which is controlled in position by a feedback loop 2 (shown in FIG. 1).

Usually this feedback loop 2 forms part of an electrical flight control system 4 of the aircraft (not shown) and includes:
said control surface 3 which is movable, being capable of being aimed as illustrated by a double arrow B in FIG. 1, and of which the position with respect to the structure of the aircraft is adjusted by at least one conventional actuator 5;
said actuator 5 which adjusts the position of said control surface 3, for example by means of a rod 6 which acts thereon, as a function of at least one actuating command received via a link 7;
at least one sensor 8,9 which measures the effective position of said control surface 3. To this end, this sensor may be a sensor 8 which is directly associated with the RVDT ("Rotary Variable Differential Transducer") type control surface 3 and/or an LVDT ("Linear Variable Differential Transducer") type sensor 9 which measures for example the displacement of the rod 6 of the actuator 5; and
a computer 10, for example a flight control computer:
which receives command information from means 11, via a link 19. These means 11 are conventional means for generating command information and comprise for example a control column which is capable of being actuated by a pilot of the aircraft and inertial sensors;
which in the conventional manner produces a control command of the control surface, with the aid of integrated calculation means 12 which contains control laws and which for this production uses command information (for example the action of the pilot on the control column, parameters which indicate the position of the aircraft about its centre of gravity, load factors to which it is subjected) received from said means 11;
which receives the effective position measured by the sensor(s) 8 and 9, via a link 13, via an analogue or digital type of input 14;
which calculates, on the basis of the preceding information (control command for the control surface and measured effective position), said actuating command, with the aid of an integrated calculation means 17 taking account of a predetermined gain; and
which transmits this actuating command (in the form of a feedback command) to a command means 18 (for example a servovalve or an electric motor) of the actuator 5, by means of the link 7 via an output 15 of the analogue or digital type.

Said electrical flight control system 4 includes, in addition to said position control feedback loop 2, the device 1 according to the invention which is intended to detect at least jamming and/or uncontrolled movement of the control surface 3, regardless of its dynamic profile and regardless of the origin of the malfunction.

For this purpose said detection device 1 includes, as shown in FIG. 1:
first means 22 for estimating the value of at least one parameter of an equation simulating the feedback loop dynamic of the control surface 3, according to a recursive autoregressive method with exogenous variable of RARX type in a recursive least squares way; and
second means 25 for detecting jamming and/or uncontrolled movement of said control surface, as a function of the value thus estimated of said parameter.

Said first means 22 transmit the estimated values of the parameter(s) in question to said second means 25 via a link 21.

Consequently, said device 1 applies a parametric test which makes it possible to detect an anomaly of the uncontrolled movement and/or jamming type in the feedback loop for position control of a control surface 3 of an aircraft.

Said device 1 makes it possible in particular to reduce the maximum values achieved in the case of uncontrolled movement and to detect jamming at low amplitudes, even about 0'. The invention improves the controllability of the aircraft and its performance and decreases the structural loads in the event of malfunction, without increasing the mass or the manufacturing cost, since it uses sources of information already present in the flight control computer and does not use specific sensors or supplementary equipment.

The parametric test uses a RARX type estimation algorithm in a recursive least squares way in order to estimate the parameters simulating the feedback loop dynamic of the control surface 3. The parameters of the identified transfer function of the closed loop vary with time and are updated at each sampling step k. After having chosen the appropriate structure for the model as a function of the physical knowledge of different elements of the feedback loop, a decision test is applied in the parameter space via means 25.

More precisely, initially the position of the control surface at the instant k is estimated, as a linear combination of past measurements of the feedback command (pilot order interpreted by the control laws) and of past measurements of outputs (of the rod position supplied by the LVDT sensor). In the knowledge that the identification algorithm applied minimises the prediction error, the estimated position will follow the real position even in the event of failure. In other words, at the moment of the malfunction, the coefficients associated with the feedback command, which is different from the real position, will converge towards 0.

The general structure of a model of RARX type is:

$$y(k)=\phi^T(k)\theta(k-1)+\epsilon(k) \quad (1)$$

where $\phi(k)$ represents all of the preceding measurements, namely those concerning the order and of the position, $\theta(k)$ represents all of the unknown parameters which vary as a function of the input $u(k)$ and the output $y(k)$ and $\epsilon(k)$ represents the effect of noise on the output, which may originate from the measurement precision error of the sensors, or the simulation error.

The vectors φ(k) and θ(k) have the following structure:

$$\begin{cases} \varphi^T(k) = [-y(k-1) \ldots -y(k-na)u(k-nk) \ldots u(k-nk-nb+1)] \\ \theta(k) = [a_1(k) \ldots a_{na}(k)b_1(k) \ldots b_{nb}(k)]^T \end{cases} \quad (2)$$

where [na nb nk] is the system command.

Knowing that based on experience a set of measurements is provided, ignoring the equation error ε(k), the predicted output at the instant k is the scalar product between the known vector of the input/output data available up to the present moment and the vector of the unknown parameters:

$$\hat{y}(k) = \varphi^T(k)\hat{\theta}(k-1) \quad (3)$$

The equation (3) is reflected in the fact that the position of the control surface 3 is calculated as a function of preceding samples of the order and of the position measured by the LVDT type sensor 9.

In the RARX type identification, the vector of the parameters θ(k) is obtained, minimising the sum of the quadratic errors between the real output y(k) and the predicted output ŷ(k). On the basis of the equations (1) and (3), it is deduced that the criterion to minimise is in this case the error ε(k) of the equation (1).

In a preferred embodiment, in the simulation and identification processes use is made of the physical knowledge relating to the different elements which constitute the closed loop in order to choose the appropriate structure of the model. For this, the position of the control surface 3 is calculated, taking into account a single old value of the order and a single value of the output at the preceding instant.

Thus the equation simulating the feedback loop dynamic is second order and has the following form:

$$\hat{y}(k) = b_1(k-1)u(k-nk) - a_1(k-1)y(k-1)$$

in which:
ŷ(k) is the estimated position of said control surface at an instant k;
y(k) is the real position of said control surface at the instant k supplied by said sensor;
u(k) is an order given by the pilot at the instant k;
nk is a number of delayed samples between the given order and the position; and
$a_1(k)$ and $b_1(k)$ are parameters to be estimated.

In a particular embodiment, a delay of ten samples (nk=10), between the order and the position, is used in the model.

The second order of the equation simulating the feedback loop dynamic enables the model to have a low calculation cost.

In a first embodiment, jamming is detected by the second detection means 25 if an estimated value of the parameter $b_1$ converges towards 0.

In fact, the principle of the RARX type identification consists of constructing the error between the estimated output ŷ(k) and the real output y(k), then using this error, at each instant, in order to modify the parameters of the model of the feedback loop so as to obtain the best prediction of the output of the system. Thus the error between the estimated output and the real output has a zero mean and a minimal variance in the manner of the criterion of recursive least squares. In the knowledge that the recursive algorithm, on the basis of a command from the model, decreases the estimation error of the output ε(k), the estimated output will follow the real output even in the event of failure. Consequently, at the moment of an anomaly, or a short time thereafter, the estimation of the output will no longer in practice give more weight to the order u(k−nk), giving all the weight to the output value at the preceding instant y(k−1).

On the basis of the equation ŷ(k)=$b_1$(k−1)u(k−nk)−$a_1$(k−1)y(k−1), the parameter $b_1$ will converge towards 0 at the moment of the malfunction. In addition, the parameter $α_1$ will converge towards −1, except in the case of jamming at 0° of the control surface 3.

Thus the parameter $b_1$ is used as signal indicating a failure, the convergence of its estimated value towards 0 indicating the appearance of jamming. The detection is therefore performed in the parametric space and not in the outputs space.

In a first variant, jamming is detected at least if said estimated value of the parameter $b_1$ is less than a first predetermined threshold during a given time.

The setting up of a long confirmation time and a short detection threshold renders the detection more robust. In fact, the higher the threshold is, the greater the risk of triggering a false alarm since the absolute value of the parameter $b_1$ could be lower than the threshold in normal operation.

Furthermore, in a second variant jamming is detected if in addition the absolute value of a feedback setpoint u is greater than a second predetermined threshold.

In fact, small orders of feedback could result in a very low value of the estimated parameter, optionally lower than the fixed detection threshold, and therefore in this precise case could lead to false alarms. Consequently, in order to ensure the robustness of the model, a supplementary condition associated with the command of the pilot is used in the decision test.

More precisely, jamming is confirmed if during a given confirmation time, the absolute value of the estimated parameter $b_1$ is less than a given threshold $s_1$, and if the absolute value of the feedback setpoint u is greater than a given threshold $s_2$. It should be noted that the value of the threshold $s_2$ is very low and that jamming at 0° for setpoints around 0° (therefore lower in absolute value than $s_2$), is not considered as a malfunction since the position of the control surface 3 corresponds in this case to the command from the pilot.

Figure 3:
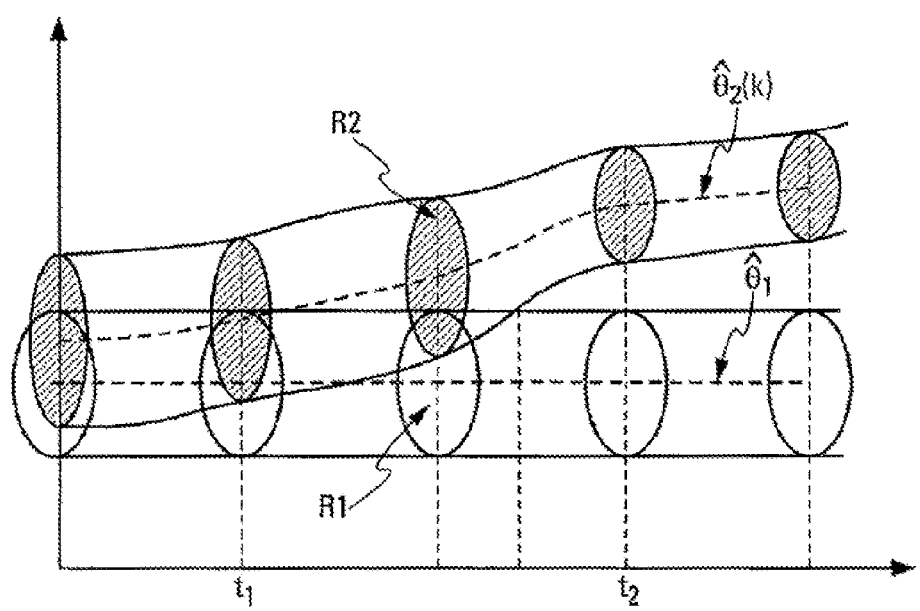
FIG. 3 shows a graph illustrating the confidence regions according to an embodiment of the invention applied to the uncontrolled movement.

According to a second embodiment, the means detects an uncontrolled movement as soon as two confidence regions R1 and R2 no longer overlap, as shown in FIG. 3. The two confidence regions R1 and R2 are defined, on the one hand, by the estimated value of the parameter $b_1$ and an associated covariance matrix, and on the other hand, by an estimated value of a reference parameter $\hat{b}_1$ and an associated covariance matrix.

This method has a low calculation cost for installation in the flight control computer 10 and does not require a supplementary optimisation procedure.

The detection test compares the real operation of the parameter $b_1$, estimated online with the aid of the RARX type algorithm, with an ideal operation of the parameter, expected when there is no malfunction. The values of the reference parameter $b_1$ and of the associated covariance matrix are estimated on the basis of a normal operating cycle. In the hypothesis where the estimated parameter is relatively constant in normal operation, a significant variation thereof is interpreted as revealing an uncontrolled movement.

In this test, the following notations are used:
$\hat{\theta}_2(k)$: parameter $b_1$ estimated online;
$\hat{\theta}_1$: reference value of the parameter $b_1$;
$C_2(k)$: covariance matrix associated with $b_1$, estimated online, intended to translate the variability of the parameter $b_1$; at each calculation step, this matrix corresponds à $p_{22}(k)$ of the system (11);

$C_1$: reference value of the covariance matrix associated with $b_1$; and

α: detection threshold.

The first confidence region R1 is constituted by the value $\hat{\theta}_1$ of the estimated parameter $b_1$ in reference operation, with the associated margins of uncertainty, given by the covariance matrix $C_1$, which in this precise case is a scalar. The second confidence region R2 is constituted by the calculations in real time of $\hat{\theta}_2(k)$ of the parameter $b_1$ with the associated margins of uncertainty, given by the covariance matrix $C_2(k)$. At the instant t1, the two confidence regions R1 and R2 overlap.

Therefore, at each calculation step, two ellipsoids are obtained in the parametric space, centred respectively on $\hat{\theta}_1$ and $\hat{\theta}_2(k)$ which are intended to have points in common in normal operation. The test amounts to verifying that a common part exists between the confidence region R1 around reference variables in nominal operation and the confidence region R2 around variables calculated online. A malfunction is detected from the moment when the two confidence regions R1 and R2 no longer overlap, at the instant t2 in FIG. 3. In other words, when the result of the test which compares the overlap between the two sets R1 and R2 is greater than a given threshold, a malfunction is confirmed. The development of two confidence regions R1 and R2 before and after the appearance of an uncontrolled movement is shown in FIG. 3.

The detection of the uncontrolled movement is carried out in three successive steps. Only the simplified version is given below, but the possibility exists of generalising the algorithm to the multidimensional case. These three steps consist of:

(i)

$$\frac{(\hat{\theta}_2(k) - \hat{\theta}_1)^2}{C_2(k)} > \alpha$$

verifying that, if this is not the case, then the two sets R1 and R2 overlap and operation is normal, (ii) seeking with the dichotomy method (or with the solution of a second order polynomial for the particular case of a single parameter), the sole negative root $\lambda_0$ of $F(\lambda)$, where:

$$F(\lambda) = \frac{V^2(\lambda)}{C_2(k)} - \alpha$$

$$V(\lambda) = \frac{C_2(k)(\hat{\theta}_2(k) - \hat{\theta}_1)}{\lambda C_1 - C_2(k)}$$

$$F(-\infty) = -\alpha$$

and $$F(0) > 0$$

with an initial value A<0 such that F(A)<0

(iii) calculating:

$$W = \frac{C_1(\hat{\theta}_2(k) - \hat{\theta}_1)}{\lambda_0 C_1 - C_2(k)}$$

$$\text{test} = \lambda_0^2 \frac{W^2}{C_1}$$

If test>α, then there is a malfunction of the uncontrolled movement type.

The second step (ii) and the third step (iii) are performed solely in the situation where the inequality of the first step (i) is valid.

The parameter α is the parameter for adjustment of the test for covering the two confidence regions, which may be associated to the probabilities of false alarm and of non-detection, via complex relationships. In other words, it appears as a synthesis parameter which manages the known compromise between a short delay in the detection and a low rate of false alarms.

In the case of an embodiment of the present invention, the threshold α is optimised on the basis of a set of input-output (order and position) data, used in order to estimate the parameter $b_1$ to which the test of overlap of the confidence regions is applied. The procedure consists of making a vary in a given range of operation, injecting uncontrolled movements with different dynamics and at different moments in time in order to draw a conclusion as to the delay in detection and the rate of false alarms. The range of operation is given by the Chi square table. In fact, in the particular case where the law of distribution of prediction error $\theta - \hat{\theta}_1$ and $\theta - \hat{\theta}_2$ is Gaussian (which is not necessarily the case in the present invention), the threshold a is chosen with the aid of the Chi square table for different probabilities of error. For example, with a probability of error equal to 0.001 (that is to say 0.1%), and therefore a confidence of 99.9% in the parameter identified, α=10.82 is obtained. A confidence of 99.9% results in a probability of 99.9% in order that the ellipse (the region of the parameter $b_1$) contains the true value of the estimated parameter and therefore a probability of 0.1% so that the real value of the parameter is outside the ellipse.

According to a third embodiment, the means 25 detect an uncontrolled movement if at the same time an estimated value of the parameter $b_1$ converges towards 0 and if, simultaneously, an error signal which is a function of data measured or used in the feedback loop (for example u and y) is greater than a third threshold during a confirmation time (the part relating to the error signal being described in the Patent Application FR1156900).

For the same reasons as in the first embodiment relating to the jamming, it is checked that the parameter $b_1$ converges towards 0. It is also checked that, simultaneously, an error signal which is a function of data measured or used in the feedback loop (for example u and y) is greater than a third threshold during a confirmation time (the part relating to the error signal being described in the Patent Application FR1156900).

A method and a device capable of being used in order to check the comparison value mentioned above are described in the Patent Application FR1156900.

The association of the two methods enables a reduction of the confirmation time used in the Patent Application FR1156900, which involves a considerable gain on the deflection of the control surface above all for very rapid uncontrolled movements.

In this third embodiment, the device 1 compares the real operation of the feedback loop monitored (which is illustrated by the effective feedback current measured by an auxiliary sensor) relative to the command of the control surface 3 with a theoretical operation expected in the absence of malfunction, which makes it possible to reveal, if applicable, uncontrolled movement of the control surface 3.

Preferably, in order that the recursive least squares algorithm is capable of following in real time the changes in the parameters of the feedback loop of the control surface 3, a forgetting factor λ is inserted in the expression of the criterion to be minimised. The forgetting factor makes it possible "to forget" the old data since they are considered as being less representative for the current status of the system relative to the recent data. The recursive form of RARX identification with forgetting factor is written:

$$\begin{cases} \hat{y}(k) = \varphi^T(k)\hat{\theta}(k-1) \\ \varepsilon(k) = y(k) - \hat{y}(k) \\ K(k) = \dfrac{P(k-1)\varphi(k)}{\lambda + \varphi^T(k)P(k-1)\varphi(k)} \\ P(k) = \dfrac{P(k-1) - K(k)\varphi^T(k)P(k-1)}{\lambda} \\ \hat{\theta}(k) = \hat{\theta}(k-1) + K(k)\varepsilon(k) \end{cases} \quad (4)$$

where K(k) and P(k) are respectively the gain and the covariance matrix associated with the calculated parameters, at the instant k.

The system (4) functions in the following manner:
the parametric model $\hat{\theta}$(k−1) estimated at the preceding sampling period is used in order to calculate the output at the present moment ŷ(k),
the output predicted at the present moment is then compared with the real output of the system y(k) and the estimation error signal ε(k) is generated,
on the basis of this error signal, the updating mechanism corrects the values of the calculated parameters of the system $\hat{\theta}$(k−1), generating $\hat{\theta}$(k).

The forgetting factor (of which the value is between 0 and 1) plays a considerable part in the quality of the predicted output. For a value of the forgetting factor very close to 1, the algorithm forgets few of the past data, which results in a slow convergence. On the other hand, a value of the forgetting factor which is too small involves a rapid adaptation of the parameters identified but with a high sensitivity in relation to noise. The forgetting factor has values between [0, 1]. Preferably, it is generally chosen between 0.95 and 0.999.

In the case of jamming, the choice of the forgetting factor of the identification procedure is for example carried out following a series of tests on a set of real data compiled in flight, injecting jamming at different moments and at different positions. The forgetting factor is then chosen in order to ensure a compromise between the robustness of the method and the precision of detection.

For the uncontrolled movement, for maximum smoothing of the parameter $b_1$, in order that it does not shift much with respect to its reference value in operation in the absence of malfunction and therefore in order not to trigger a false alarm, a forgetting factor close to 1 is chosen. It is greater than in the case of jamming.

In addition, in order to make the RARX estimator more robust, the forgetting factor is directional, that is to say used only in one direction of excited data. More precisely, the old data are taken into account only when they can be replaced by new data. In fact, in the conventional algorithm the old information is forgotten uniformly in all directions (each direction corresponds to an estimated parameter) and in a continuous manner in time, but only a part of the old data can be replaced by new information φ(k). The principle of directional forgetting applied when the input information is distributed in a non-uniform manner in the parameter space, where the input does not excite the system in all directions, is therefore to update the covariance matrix only in the direction in which persistent data arrive in order to compensate for the forgotten information. In other words, the old information is forgotten only in the direction of new input data excited in order to ensure the convergence of estimations and to avoid of substantial variations of parameters.

The system (4) then becomes:

$$\begin{cases} \hat{\theta}(k) = \hat{\theta}(k-1) + K(k)\varepsilon(k) \\ \varepsilon(k) = y(k) - \varphi^T(k)\hat{\theta}(k-1) \\ K(k) = \dfrac{P(k-1)\varphi(k)}{1 + \varphi^T(k)P(k-1)\varphi(k)} \\ P(k) = P(k-1) - \dfrac{P(k-1)\varphi(k)\varphi^T(k)P(k-1)}{(\beta(k))^{-1} + \varphi^T(k)P(k-1)\varphi(k)} \\ \beta(k) = \begin{cases} \lambda - \dfrac{1-\lambda}{\varphi^T(k)P(k-1)\varphi(k)} & si\,\varphi^T(k)P(k-1)\varphi(k) > 0 \\ 1 & si\,\varphi^T(k)P(k-1)\varphi(k) = 0 \end{cases} \end{cases} \quad (5)$$

In the system (5), it will be noted that the parameter β(k) becomes variable in the equation for updating of the covariance matrix P(k), solely in the direction of the persistent data ($\varphi^T$(k)P(k−1)φ(k)>0). In the contrary case, β(k)=1.

Thus, the calculation is less sensitive to noise and there is a lower risk of digital errors or errors in calculation of the parameter(s).

In a particular variant, the RARX type method takes into account a step of UD factorisation according to Bierman, in order to prevent the divergence of the calculated parameters of the feedback loop of the control surface 3 and in order to ensure the digital robustness of the method. On the one hand it has a low calculation cost relative to other existing methods which use the square root of the covariance matrix. On the other hand it avoids the risk of digital instability.

A factorised version of the covariance matrix of the system (5) is then applied:

$$P(k) = U(k)D(k)U^T(k) \quad (6)$$

where U is an upper triangular matrix with unitary values on the diagonal and D is a diagonal matrix. In other words, at each calculation step k, U(k) and D(k) are updated instead of performing the calculations directly on P(k). The advantages of this factorisation are the digital stability and precision and the fact of guaranteeing that the covariance matrix is defined as positive.

The directional forgetting and the UD factorisation according to Bierman have the object of remedying the practical problems of inserting the RARX recursive identification algorithm with forgetting factor used in order to calculate the parameters of the dynamic mono-input mono-output feedback system, in order to detect an anomaly of the control surface 3. The improvement in the digital robustness of the algorithm leads to the integration of several supplementary operations, but its complexity of calculation nevertheless remains low and compatible with the flight control computer 10.

Knowing that U is an upper triangular matrix with unitary values on the diagonal and D is a diagonal matrix, in a particular embodiment of a second order model the expressions of the matrices U and D at each calculation step are:

$$U(k) = \begin{bmatrix} 1 & u_1(k) \\ 0 & 1 \end{bmatrix} \quad (9)$$

$$D(k) = \begin{bmatrix} d_1(k) & 0 \\ 0 & d_2(k) \end{bmatrix} \quad (10)$$

By introducing the equations (9) and (10) into the relationship (6), with $$P(k) = \begin{bmatrix} p_{11}(k) & p_{12}(k) \\ p_{21}(k) & p_{22}(k) \end{bmatrix},$$

the elements of the covariance matrix are deduced:

$$\begin{cases} p_{11}(k) = d_1(k) + u_1^2(k)d_2(k) \\ p_{12}(k) = u_1(k)d_2(k) \\ p_{21}(k) = u_1(k)d_2(k) \\ p_{22}(k) = d_2(k) \end{cases} \quad (11)$$

Using the relationships (11) in the expressions of the gain K(k) and of the covariance matrix P(k) of the system (5), the final equations are obtained which enable the means 22 of the flight control computer 10 to calculate the parameters of the feedback loop of the control surface 3. The two first equations of the system (5) for updating the parameters and the estimation error remain unchanged.

In the embodiment relating to the confidence regions R1, R2 for the detection of an uncontrolled movement, the reference values of the parameter $b_1$ and of the associated covariance matrix are fixed offline. They are established using the same set of input-output data. The nominal values are for example fixed by applying the RARX estimator with forgetting factor during a relatively short time, at the start of the data set, up to the moment of the convergence. In this case, the values of the parameter $b_1$ and of the component $p_{22}$ of the covariance matrix are used which are associated respectively with $\hat{\theta}_1$ and $C_1$.

Another method consists of characterising the reference behaviour following a succession of simulations during a sufficiently long time and for regions with different dynamics of the data set in normal operation. The parameter $b_1$ and the covariance matrix are estimated offline with the aid of the ARX ("autoregressive exogenous input") identification. The reference values $\hat{\theta}_1$ and $C_1$ obtained therefore correspond to a mean behaviour of the feedback loop in normal operation.

Moreover, during detection, the device 1 transmits in the aircraft cockpit, via alarm means (which are for example connected by a link to the detection means 25), a visual and/or audible alarm signal in order to warn the flight crew of the malfunction and to enable them to perform the actions limiting the consequences of this malfunction.

The detection of jamming and/or an uncontrolled movement makes it possible in particular to switch the active actuator to passive mode and to use the second actuator which is then in active mode, in order to prevent the continuance of the uncontrolled movement or else to unjam the control surface 3.

Figure 2:
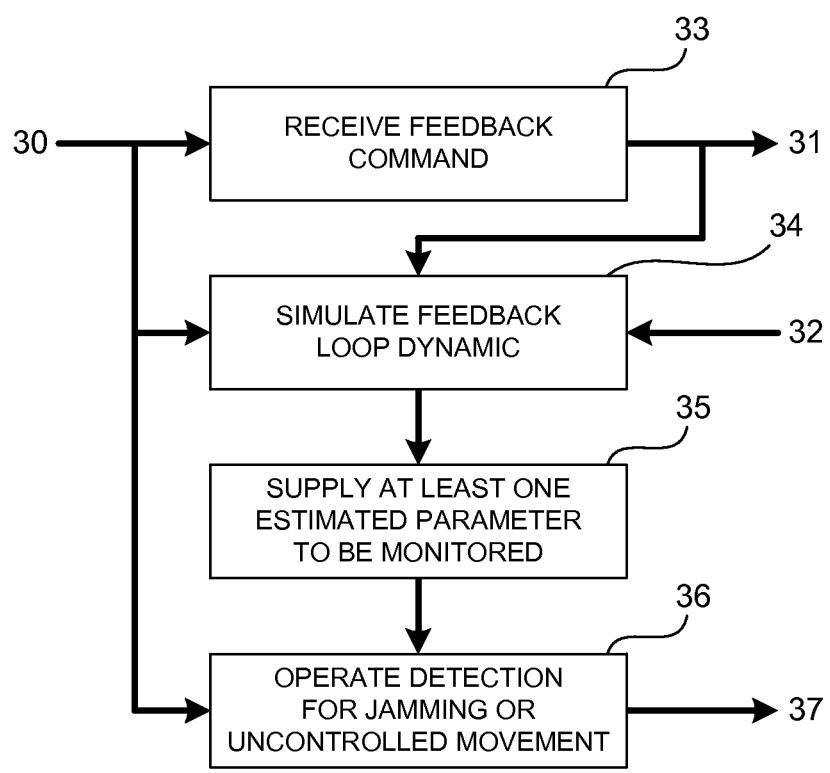
FIG. 2 shows a block diagram of the method according to the invention.

The block diagram of FIG. 2 shows a feedback command 30 given to the feedback loop in the step 33. The feedback command 30, the position measured at the output 31 by a LVDT type sensor 9 and the forgetting factor 32 adopted according to the detection to be performed, make it possible to simulate the feedback loop dynamic in the step 34. This model supplies at least one estimated parameter to be monitored in the step 35. In the step 36, the detection is operated for jamming or uncontrolled movement according to at least one of the embodiments described above. The detection can require time for confirmation of the feedback command 30, in order to avoid false alarms in the case of jamming for example. A signal 37 is sent in the event of detection of an anomaly.

The invention claimed is:

1. A method for detecting at least one of jamming and uncontrolled movement of an aircraft control surface controlled in position by a feedback loop forming part of an electrical flight control system of the aircraft and including:
    said control surface, which is movable and of which the position with respect to the aircraft is adjusted by at least one actuator;
    said actuator which adjusts the position of said control surface, as a function of at least one actuating command received in the form of a feedback command;
    at least one sensor which measures the effective position of said control surface; and
    at least one computer which produces a control command for the control surface, which receives said measured effective position and which deduces therefrom an actuating command which is transmitted to said actuator in the form of a feedback current,
    wherein the method comprises performing, in an automatic and repetitive manner:
    a) estimating the value of at least one parameter of an equation simulating the feedback loop dynamic of the control surface, according to a recursive autoregressive method with exogenous variable of RARX type in a recursive least squares way; and
    b) detecting at least one of jamming and uncontrolled movement of said control surface, according at least to the estimated parameter value by the application of a decision test in the parametric space.

2. The method according to claim 1, wherein in the step a), the equation simulating the feedback loop dynamic is second order and has the following form:

$$\hat{y}(k) = b_1(k-1)u(k-nk) - a_1(k-1)y(k-1)$$

in which:
    $\hat{y}(k)$ is the estimated position of said control surface (3) at an instant k;
    y(k) is the real position of said control surface at the instant k supplied by said sensor;
    u(k) is a setpoint, at the instant k, calculated by a flight control computer on the basis in particular of a command given by the pilot;
    nk is a number of delayed samples between the given order and the positioning; and
    $a_1(k)$ and $b_1(k)$ are parameters to be estimated at the instant k.

3. The method according to claim 2, wherein in the step b), detecting jamming at least if, said estimated value of the parameter $b_1$ converging towards 0, its absolute value is less than a first predetermined threshold during a given time.

4. The method according to claim 2, wherein in the step b), defining first and second confidence regions by the estimated value of the parameter $b_1$ and an associated covariance matrix estimated online, and, by a calculated value of a reference parameter $b_1$ and an associated covariance matrix, and detecting an uncontrolled movement as soon as first and second confidence regions no longer overlap.

5. The method according to claim 2, wherein in the step b), detecting an uncontrolled movement if at the same time an estimated value of the parameter $b_1$ converges towards 0 and if, simultaneously, an error signal which is a function of data measured or used in the feedback loop is greater than a third threshold during a confirmation time.

6. The method according to claim 1, wherein in the step b), detecting jamming if an estimated value of the parameter $b_1$ converges towards 0.

7. The method according to claim 6, wherein in the step b), detecting jamming if in addition the absolute value of a feedback setpoint u is greater than a second predetermined threshold.

8. The method according to claim 1, wherein in the step a), the RARX type method takes into account a directional forgetting factor.

9. The method according to claim 8, wherein the directional forgetting factor has a first value in order to detect jamming, and a second value in order to detect uncontrolled movement, the first value being less than the second value.

10. The method according to claim 1, wherein in the step a), an improved version of the RARX type method is used, by the introduction of a directional forgetting factor and a step of UD factorisation according to Bierman.

11. The method according to claim 1, further comprising, wherein in the event of detection of jamming or uncontrolled movement in the step b), issuing an alert.

12. A device for detecting at least one of jamming and uncontrolled movement of an aircraft control surface which is controlled in position by a feedback loop, said feedback loop forming part of an electrical flight control system of the aircraft and including:
    said control surface, which is movable and of which the position with respect to the aircraft is adjusted by at least one actuator;
    said actuator which adjusts the position of said control surface, as a function of at least one actuating command received in the form of a feedback command;
    at least one sensor which measures the effective position of said control surface; and
    a computer which produces a control command for the control surface, which receives said measured effective position and which deduces therefrom an actuating command which is transmitted to said actuator in the form of a feedback current, the device comprising:
        first means for estimating the value of at least one parameter of an equation simulating the feedback loop dynamic of the control surface, according to a recursive autoregressive method with exogenous variable of RARX type in a recursive least squares way; and
        second means for detecting at least one of jamming and uncontrolled movement of said control surface, according at least to the estimated parameter value by the application of a decision test in the parametric space.

13. An electrical flight control system of an aircraft, said system comprising:
    at least one means in order to generate a control surface control command for at least one control surface of the aircraft;
    at least one feedback loop for controlling the position of the at least one control surface; wherein said control surface, which is movable and of which the position with respect to the aircraft is adjusted by at least one actuator,
    wherein said at least one actuator adjusts the position of said control surface, as a function of at least one actuating command received;
    at least one sensor which measures the effective position of said control surface; and
    a computer which produces said control command for the control surface, which receives said effective position and which deduces therefrom an actuating command which is transmitted to said actuator; and
    a detection device comprising:
        first means for estimating the value of at least one parameter of an equation simulating the feedback loop dynamic of the control surface, according to a recursive autoregressive method with exogenous variable of RARX type in a recursive least squares way; and
        second means for detecting at least one of jamming and uncontrolled movement of said control surface, according at least to the estimated parameter value by the application of a decision test in the parametric space.

* * * * *